March 1, 1960

J. EIFEL 2,926,763

VEHICLE BRAKE-OPERATING MEANS

Filed Dec. 14, 1954

Inventor.
Joseph Eifel.
by Parker & Carter.
Attorneys.

March 1, 1960

J. EIFEL 2,926,763

VEHICLE BRAKE-OPERATING MEANS

Filed Dec. 14, 1954

Inventor.
Joseph Eifel,
by Parker & Carter,
Attorneys.

United States Patent Office 2,926,763
Patented Mar. 1, 1960

2,926,763
VEHICLE BRAKE-OPERATING MEANS
Joseph Eifel, Chicago, Ill.
Application December 14, 1954, Serial No. 475,057
36 Claims. (Cl. 192—13)

This invention is directed to an improved vacuum and atmospheric motivated actuating and control system most generally applicable to operating automotive braking systems, but also to many other purposes.

A major object of the present invention is the provision of a vacuum and atmospheric power unit and multiple operating controls therefor for actuating the braking systems of motor vehicles, such as automobiles and motor trucks, also referred to herein as cars, whereby the operator of such a vehicle may apply the brakes thereof and retard movement of the car, with his left foot, while leaving his right foot at rest and free for operating the accelerator of the car. Many advantages are gained thereby. Among them are, that the delay in brake application and car retardation due to moving the foot from the accelerator to the brake pedal, as in the standard type of right foot brake control, is fully eliminated. Also, as the car may be in control of both the accelerator and the brakes simultaneously as desired, the control of the car speeds and car maneuverability are greatly increased and improved, thereby adding much to the safety of motor vehicle operation.

Another object of the present invention is the provision of a vacuum and atmospheric motivated power unit and multiple operating controls therefor, which may be economically installed for use in cars having standard types of braking systems with right foot controls, to give the operators thereof the advantages of power-activation of the standard right foot brake pedal and of a left foot pedal for control of brake applications.

Another object of the present invention is the provision of a power braking mechanism for cars, having an auxiliary actuating control which is positioned in relation to the clutch-pedal, in cars having such, in a manner to provide for control of the brakes by the clutch pedal when depressed beyond the level of clutch release. This is of special advantage when stopping or starting a car and particularly when on hills and grades.

Another object of the present invention is the provision of an improved valve for finely graduated control of negative pressures in vacuum and atmospheric power applications, through finely graduated and controlled proportioning actions by the valve, between a source of vacuum and a source of atmospheric air, and including provision of means for finely adjusting the effective ranges of the proportioning actions and thereby of the power transmission, to serve in a wide variety of applications.

Another object of the present invention is the provision of improved pedal and/or manual means for operating and controlling vacuum and air valves and the like.

A further object of the present invention is the provision of an improved vacuum and atmospheric motivated signal system for warning the operator of a car instantly of any failure of the vacuum effect, due to stoppage of the engine or other causes, so that the proper measures may be taken in due time.

A still further object of the present invention is the provision of improved means interconnected in a vacuum and atmospheric power brake system for showing a warning signal light at the rear of a car, which may be applied by activating the brake control valve at low pressure without retarding car speed if desired, thus giving earlier warning than does the standard type and independently thereof.

Other objects will appear from time to time in the course of the ensuing specification and claims.

Referring now to the drawings.

Figure 1:
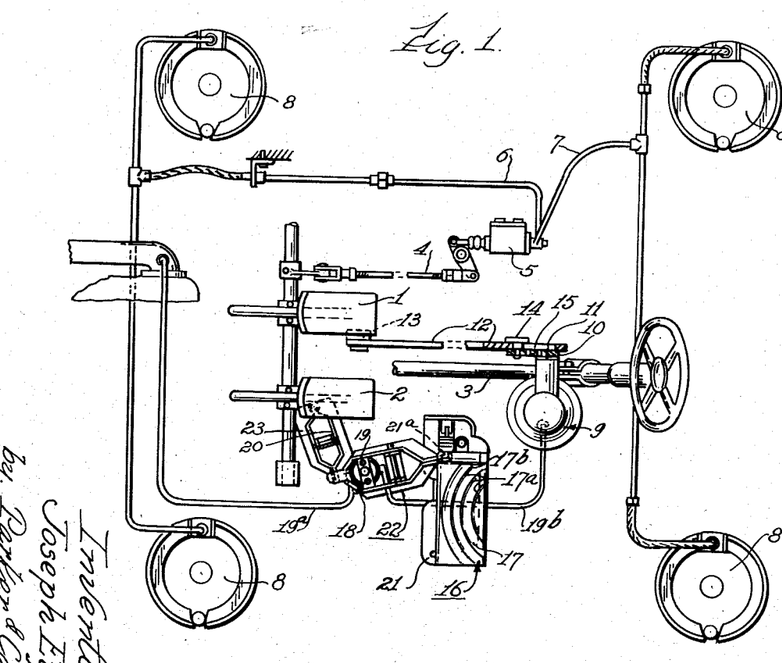
Figure 1 is a diagrammatic showing of my improved braking system.

Referring specifically now to the drawings, wherein like elements are designated by like characters throughout, and in the first instance to Figure 1, the conventional right foot-operated brake pedal in general use in cars is generally designated at 1. The conventional left foot-operated clutch pedal for actuating the clutch of a car is designated generally at 2. The steering column is represented at 3. Brake pedal 1 is adapted to actuate, through any suitable linkage 4, a hydraulic unit 5, which supplies hydraulic fluid under pressure, through conduits 6 and 7, to each of the wheel brakes represented diagrammatically at 8.

Depression of the brake pedal 1, forces hydraulic fluid, under pressure, to the braking mechanism of each wheel to actuate the brakes of the car. Whereas I have herein shown and described a hydraulically actuated braking system, I wish it to be understood that this is to be taken as illustrative only. My invention may be applied with equal facility to a totally mechanical braking system, or to one using a combination of fluid and mechanical means.

According to my invention, a vacuum and atmospheric activated power unit 9 is adapted to be mounted upon the steering column 3, or upon a suitable bracket, in operational relationship to the inbuilt right foot brake pedal 1. The unit 9 is preferably of the diaphragm-formed vacuum chamber type and has a power take-off bell crank 10 rockable about a pivot 11 and actuated by atmospheric pressure on an open side of said diaphragm when said diaphragm is subjected to vacuum on the other side thereof from a source of vacuum.

A linkage 12 is pivotally connected with the brake pedal 1, as at 13, and is connected with the bell crank 10 through a lost motion pin and slot connection 14 and 15. As arranged, when the brakes are applied by the right foot brake pedal 1 the pin 14 rides free in the slot 15, but when applied by the power unit 9, the bell crank 10 rocks about its pivot 11 in a clockwise direction and force is applied through the pin 14 and the linkage 12 to the pedal 1 to apply the brakes of the car.

I employ a combined foot rest and foot pedal unit 16, which is preferably disposed laterally of and below the clutch pedal 2 and near the left wall of the driver compartment, in a position where the operator of the car may most conveniently rest the ball of his left foot upon the pad 17 of this pedal unit 16 and apply pressure thereon for operating the braking system. It should be understood that the pedal unit 16 is normally mounted on the inclined portion of the floorboard.

A pedal pad 17 is shown as provided with a series of generally concentric arcuate grooves or slots 17a in its upper surface to provide slight traction between the pedal and the foot of the operator and to receive and drain off dust and dirt from the operator's shoe, and with a guard ridge 17b.

The pedal unit 16 is adapted to actuate and control a valve unit 18 which controls the vacuum flow from a conduit 19a interconnected with a source of vacuum, such as the intake manifold of a car, illustrated diagrammatically in Figure 1, to a conduit 19b interconnected with the power unit 9. A base 21 of the pedal unit 16 is joined at one end, adjacent to the valve unit 18, to one end of a base 22 of said valve unit as by a pivot pin 21a, and the base 22 is pivotally joined at its opposite end to a base 23 of an auxiliary rocker arm unit 20. Unit 20 is adapted for operation by the clutch pedal 2 in a manner to be more fully explained in the ensuing portions of this specification.

Figures 2, 3, 4, 5:
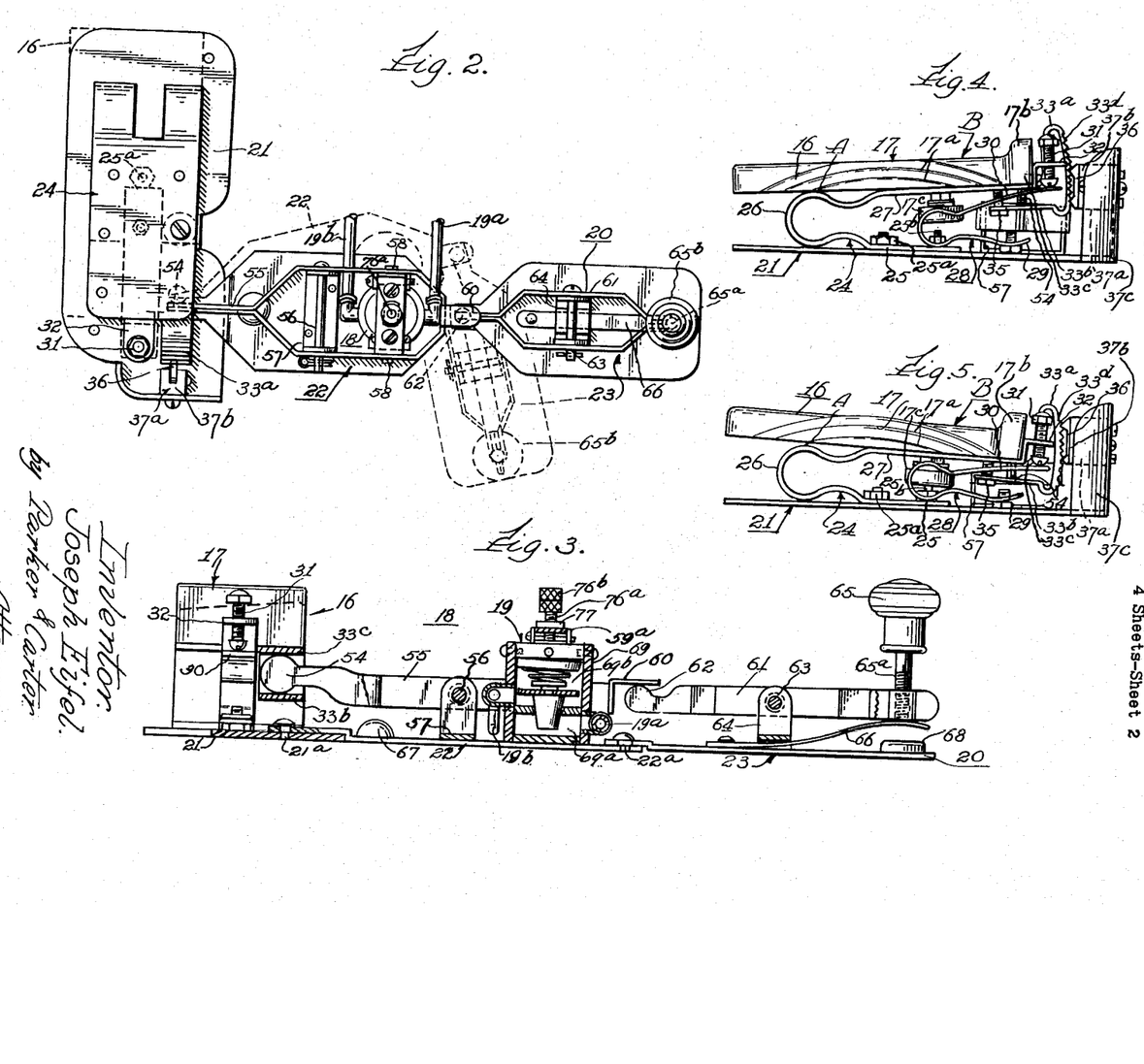
Figure 2 is a plan view of the control valve and actuating mechanism of the system shown in Figure 1.
Figure 3 is a sectional showing of the mechanism shown in Figure 2.
Figure 4 is an end view of a portion of the mechanism shown in Figure 2.
Figure 5 is a view similar to Figure 4 but showing a different operative position of the elements shown in Figure 4.

As will be seen best in Figure 4, the pedal pad 17 is mounted upon a generally U-shaped flat leaf spring 24 having a bifurcate basal portion 25 attached to the pedal unit base 21 as by means of bolts and nuts 25a and 25b. The spring 24 is formed with a generally arcuate hinge and bight portion 26 forming a point of support A for the pedal pad 17 and the pedal pad 17 is supported on a pedal leg 27 of the spring 24 overlying the basal portion 25. The pedal pad may be attached to the leg 27 of the spring by any suitable means or may be molded around it.

As will also be seen in Figure 4, the pedal leg 27 of the spring 24 extends to an operating end B of the pedal pad 17 and the opposite end of the pad 17 extends beyond the hinge portion 26 of the spring. With this arrangement the portion of the pad 17 generally over the hinge portion 26 affords a generally rigid support and rest for the foot of the operator, but is rockable about the hinge portion of the spring at A, as a pivot, to allow downward movement of the operating end B of the pad 17 from its higher neutral position, shown in Figure 4, to activate a valve unit 18 and the power unit 9 and thereby the brakes of the car. To effect this the operator needs merely to tilt his foot sideward with a light downward pressure and thereby depress slightly the portion B of the pad 17. As an alternative, the operator may simply slide his foot toward the end B and depress the pedal pad 17. Such downward movement may be limited by an adjustable bumper member 17c attached to the leg 27 of the spring 24.

A second generally U-shaped leaf spring 28 has its basal leg portion 29 secured to the base plate 21 and has a pedal leg portion 30 bearing against an adjustable screw 31 carried by a bracket 32 adjacent to the end B of the pedal pad 17. The bracket 32 may be formed as an extension of the leg 27 of the spring 24. The spring 28 serves to provide added resilient support for the end B of the pad 17. The tension of that support may be varied by the turning of the adjusting screw 31.

The pedal unit 16 carries a movement retarding means including a strip formed into a generally U-shaped portion 33a and a pair of spaced and angularly disposed legs 33b and 33c. The legs 33b and 33c provide means for attachment to the pedal leg 27 of the spring 24 as by a bolt 35 and also provide a spaced bracket for receiving an end portion 54 of a rocker arm 55 which operates the valve unit 18 in a manner to be described. The portion 33a carries an arcuate toothed rack portion 33d disposed to move radially about the pivotal point A, and in contact with a pawl 36 of a pawl assembly 37a, shown sectionally in Figures 10 and 11.

Figures 6, 7, 8, 10, 11, 12, 13:
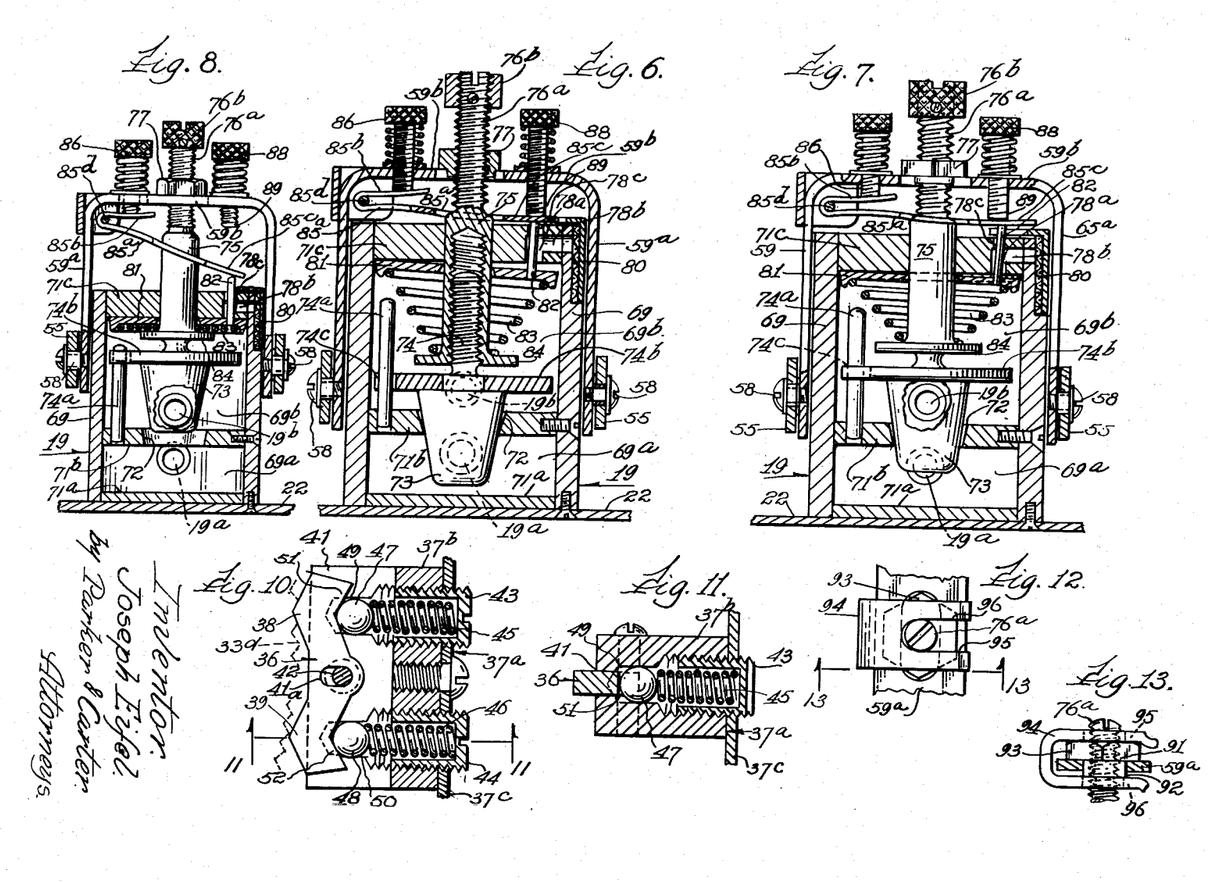
Figure 6 is an enlarged sectional view of the valve unit shown in Figure 2.
Figure 7 is a view similar to Figure 6 but showing another operative position of the valve elements shown in Figure 6.
Figure 8 is a view similar to Figures 6 and 7, but on a smaller scale and showing still another operative position of the valve elements shown in those figures.
Figure 10 is an enlarged detailed view of certain escapement elements shown in Figures 4 and 5.
Figure 11 is a sectional view of the elements shown in Figure 10 taken along the section line 11—11 of Figure 10.
Figure 12 is a detail view of a modification of my invention.
Figure 13 is a sectional view of the modification shown in Figure 12 taken along the section line 13—13 of Figure 12.

The pawl assembly or unit 37a includes an upstanding block 37b carried by an upstanding bracket portion 37c of the base plate 21. A pawl 36 is received in a slot 41 formed in the block 37b. Pawl 36 is provided with a pivotal slot 41a which receives a pin 42 carried by the block 37b. The pin and slot arrangement allows the pawl 36 to pivot about the pin 42 and also allows lateral movement along the slot, as seen in Figure 10. A pair of vertically spaced retaining cups 43 and 44 are threadably received in the block 37b. Each cup surrounds an end portion of a preloaded compression spring, as at 45 and 46. The other ends of springs 45 and 46 contact bearing balls 47 and 48, which are rotatably received in associated bores 49 and 50 formed in the block 37b. The pawl includes indented portions 51 and 52, generally aligned with teeth 38 and 39 of the pawl. Portions 51 and 52 serve as bearing pockets for the balls 47 and 48. The springs 45 and 46 serve to maintain the spaced teeth 38 and 39 carried by the pawl 36 in resilient engagement with the teeth of the rack portion 33d, which is disposed contiguous to the pawl 36.

The teeth 38 and 39 of the pawl 36 are so spaced as to generally bridge several teeth in the rack portion 33d and to have one tooth of the pawl rest upon a ridge of a rack tooth while the other tooth seats in a space between two rack teeth, thus alternating the click effect of the two teeth and providing for a smooth escapement action and two click effects for each rack tooth moved over.

The movement retarding means operate generally as follows: When alternate downward and upward movement of the foot of the operator causes a corresponding movement of the end B of the pedal 17, the teeth of the pawl 36 pass in contact over the teeth of the rack 33d in a clicking escapement action and offer yielding frictional and closely spaced click-resistance to both upward and downward movements. Such resistances may be finely adjusted to the desires of the operator and for each pawl tooth individually by turning of the cups 43 and 44 inwardly or outwardly. Major effects of such resistances are that the foot of the operator is steadied for holding the pedal 17 in any operative position and they give the operator a definite feeling of the extent of the pedal movement and of the relative position of the pedal and enables him to closely pre-position the pedal to produce desired graduated braking effects.

The movement-retarding unit 37a and the associated toothed rack 33d is readily adaptable to a variety of pedals, arms and the like used for operating valves, accelerators, and the like having reciprocal movements.

The valve unit 18 shown sectionally in Figures 6, 7 and 8 includes a valve assembly 19, a pivoted rocker arm 55 and a support 57 for rocker arm 55, mounted in operative relationship on the base plate 22 which is pivotally joined to the base plate 21 of the pedal unit 16, as at 21a, concentric with the position of the end 54 of the rocker arm 55, such as to allow for generally 90 degree displacement radially of pedal unit 16 for most favorable relative disposition of the units.

Rocker arm 55 is pivotally connected as at 58 to a valve-actuating yoke 59.

An auxiliary rocker arm unit 20 is pivotally connected with the valve unit 18 as at 22a. Rocker arm 55 includes a flange 60 overlying one end of an auxiliary rocker arm 61 which is pivotally mounted as at 63 upon an upstanding bracket 64 carried by the base plate 23. The other end of the arm 61 includes an upstanding adjustable stem 65a carrying a knob 65. A leaf spring 66 biases the auxiliary rocker arm 61 into a neutral position shown in Figure 3. Knob 65 is adapted for positioning beneath a projecting portion of the clutch pedal of the car, whereby depression of the clutch beyond the point of clutch release actuates rocker arm 61, rocker arm 55, and yoke 59 to operate the valve 19 and the power unit 9. Thus the system is responsive to depression of the clutch pedal for operating the brakes.

The valve assembly 19 includes a generally cylindrical upstanding body 69. The valve body 69 is divided into a body chamber 69b and a basal chamber 69a as by means of a basal closure member 71a, a partition member 71b and a cap member 71c.

The partition member 71b includes a generally central opening forming a valve port and seat 72 which seat may be conical in form, as will be seen in Figure 6. A generally conical valve plug 73 is adapted to move into and out of the port 72 and to finely graduate the flow of vacuum effect to the body chamber 69b. Preferably the taper of the valve seat is slightly greater than that of the valve plug 73 to form a line contact when the plug 73 is in its lowermost and closed position.

The valve plug 73 includes an upwardly extending threaded stem portion 74 which is received by an internally threaded stem 75. The upper portion of the stem 75 is threaded externally as at 76a and is received by a frictional lock nut 77. The lock nut 77 has a narrowed lower portion received by a generally oblong opening in the yoke plate 59b which precludes rotation of the nut 77. A conical spring 83 is seated between a flange 84 on the stem 75 and a disk 81 bearing against the inner surface of the cap member 71c by reason of the spring pressure between the flange and the disk. The nut 77 provides means for adjusting and maintaining the correct operational relationship between the yoke plate 59b and the valve plug 73 and for lifting the stem 75 by the yoke plate 59b against the downward thrust of the spring 83, and also for adjusting and maintaining the desired tensions in the spring 83. The relationship of the plug 73 is adjusted by turning the nut 77 on the stem portion 76a after raising the nut clear above the yoke plate 59b. Tensions in the spring 83 are adjusted by turning the nut 76b and thereby the stem 75 when the nut 77 is seated in the yoke plate 59b, which does not alter the relationship between the yoke plate and the plug 73, since the threads 76a and 74 have equal pitch.

An upstanding guide pin 74a is mounted in the partition 71b. A disk member 74b is carried by the valve plug 73 and has an aperture 74c embracing the guide pin 74a. The guide pin 74a allows vertical movement of the plug 73 but precludes rotation thereof.

The basal chamber 69a communicates with conduit 19a and a source of vacuum such as the intake manifold of the automotive engine, and is generally subject to the same vacuum effect as is the source of vacuum. The body chamber 69b communicates through the conduit 19b with the vacuum atmospheric power unit 9. Means are provided for controlled admission of atmospheric air to the body chamber 69b, including a vertical valve port 78a formed in the cap member 71c and merging with a lateral vent 78b through the side wall of the valve body. A baffle and filter 80 may cover the opening of vent 78b.

The disk 81 serves as an atmospheric air-metering member and is loosely received around the stem 75 and is adapted to seat against the inner surface of the cap member 71c and to provide a resilient closure for the port 78a, as will be best seen in Figure 7. The disk 81 carries a pin 82 of small diameter which is received within the port 78a without materially restricting it and by a vertical bearing opening 78c merging with the port 78a.

The generally conical spring 83 seats at its larger diameter against the under surface of the disk 81 and at its smaller end upon the flange 84 carried by the stem 75. Normally when the valve plug is in the nearly closed position as in Figure 7, the spring 83 is extended and exerts only a light pressure upon the underside of the disk 81.

A leaf spring 85a is folded around a bearing pin 85d carried by the yoke plate 59b, forming a short leg 85b extending under an adjusting screw 86 in the yoke plate 59b, and a longer leg 85c extending over and bearing upon the upper end of the pin 82. Resilient pressures of the spring 85a upon the disk 81 by the pin 82 favor the flow of atmospheric air to the body chamber 69b and to a degree counteract the restricting effects on that flow of the pressures of the spring 83 on the underside of the disk 81.

A screw 88 is carried by the yoke plate 59b in position over the end portion 85c of the spring 85a and over the pin 82, providing positive means for depressing the side of the disk 81 under the port 78a to freely admit air to the body chamber 69b and to the vacuum chamber of the power unit 9 to quickly release braking effects when the pedal 17 is returned to neutral position and the plug 73 to its closed position, as shown in Figure 6.

Figures 12 and 13 show views of a generally U-shaped clip member 94 as applied over the nut 77 and the yoke plate 59b. The legs of the clip 94 are spaced to embrace the top and bottom surfaces of the nut 77, and a portion of each leg is removed as at 95 and 96 to receive the stem 76a. The clip serves to give the yoke plate a positive downward thrust on the nut 77 and thereby on the valve stem 75, additional to the resilient downward thrust of the spring 83 on the flange 84 and the stem 75.

Figure 14:
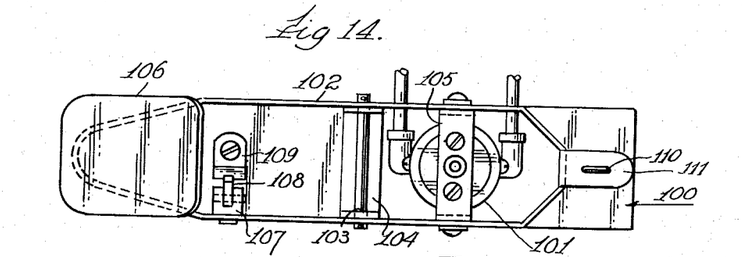
Figure 14 is a diagrammatic view showing a modification of the units shown in Figure 3.
Figure 15:
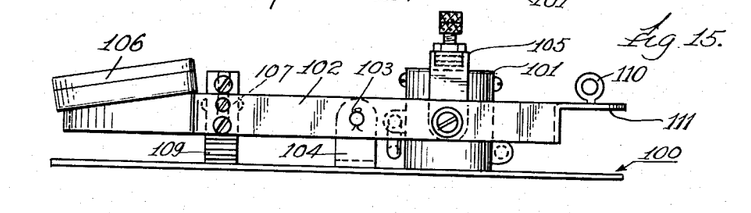
Figure 15 is a plan view of the device shown in Figure 14.

Figures 14 and 15 illustrate a modification of the invention. In these figures a base plate 100 serves as a support for a valve housing 101 and a valve-operating rocker arm 102 pivotally mounted as at 103 upon an upstanding bracket 104 carried by the base plate 100. A yoke 105 serves, upon vertical movement thereof, to operates the valve. The functioning of the valve 101 in response to the movement of the rocker arm 102 is, in all respects, similar to the functioning of the valve arm shown in Figures 1 to 13, inclusive.

In these figures a pedal 106 is mounted directly upon the rocker arm by any suitable means (not shown). Rocker arm 102 has affixed thereto a pawl block 107 mounting a pawl 108 adapted for engagement with an upstanding toothed rack 109 mounted upon the base plate 100. The rack 109 is, in all respects, similar to the rack 33d shown in Figures 4 and 5 except for a linear disposition of the teeth of the rack as opposed to the arcuate disposition shown in Figures 4 and 5. The details of the pawl block 107 and pawl 108 are in all respects similar to the details of the pawl 36 shown in Figure 10. In these figures progressive movement of the pedal through the full range of valve opening and closing movement is retarded by the pawl and rack escapement mechanism, which provides frictional and click resistance as the teeth of the rack pass successively over the toothed portions of the pawl, as is the case with the escapement mechanism shown in Figures 1 through 13.

According to the modification shown in Figures 14 and 15, an eyelet 110 is formed in the rocker arm, to which may be attached any suitable cable or the like leading to a hand-control for the valve 101. The rocker arm 102 includes a flange portion 111 which is adapted for contact with the auxiliary operating unit shown in Figures 1 through 13. With this modification the valve unit and operating means therefor may be mounted upon the inclined portion of the floorboard of a car.

Under certain conditions certain safety features may be desirable in connection with the system shown and described herein. For example, an electrical buzzer circuit may be included wherein a switch member included in the circuit for actuating the buzzer is responsive to a failure of the vacuum leading from the intake manifold to thereby give the operator of the vehicle a warning when the available vacuum for operating the brakes is less than that necessary. In addition, a switch member operated by a bellows or other suitable arrangement responsive to a negative pressure in the body chamber 69b may serve to close a circuit for a brake warning signal carried at the rear of the vehicle to thereby instantaneously warn following vehicles when the pedal 17 is depressed even slightly and even before vacuum in the power unit 9 is sufficient to apply braking effects.

Whereas I have shown and described an operative form of my invention, I wish it to be understood that this showing and description thereof is to be taken in an illustrative or diagrammatic sense only, that there are many modifications of the invention falling within the scope and spirit of the invention which will be apparent to those skilled in the art. The scope of the invention, therefore, should be limited only by the scope of the hereinafter appended claims.

Figure 9:
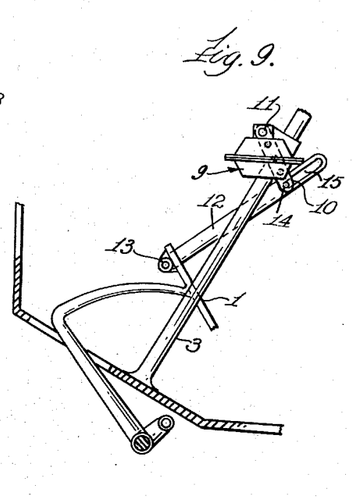
Figure 9 is a schematic showing of a vacuum power unit and brake-pedal member in my invention.

The use and operation of my invention are generally as follows:

I illustrate an automotive braking system which is so formed that it may be conveniently applied to existing automobiles. The only material modifications necessary to the standard automobile to utilize the present invention are the installation of the power unit as shown in Figure 9, the seating of the valve-operating members and valve assembly on the floor-board of the automobile and the connection of the conduit 19a to the intake manifold of the automobile, and the connection of the pedal unit 16. The valve unit 18 and auxiliary unit 20 are so designed that they may be conveniently placed and adjusted to suit the needs of the individual vehicle operator. The pedal unit 16 and the valve unit 18 may be adjusted to any desired angular position through a range generally of 90 degrees. Similarly, auxiliary rocker arm unit 20 is joined with the base of the valve unit 18 to allow for an axial adjustment through a range on the order of 180 degrees. Due to the articulation of the three units 16, 18 and 20, they may be placed in any desired relative position within the ranges of adjustment and affixed to a base plate (not shown) to hold them in the desired predetermined position, thereby facilitating installation and removal as a group unit.

Furthermore, this type of connection between the auxiliary rocker arm unit and the valve unit allows the auxiliary rocker arm unit to be disconnected from the valve unit when it is not desired.

The pedal unit 16 is so formed that the operator of the vehicle may conveniently rest his foot upon the pedal and actuate the braking system for the automobile by a mere rocking movement of that foot, and without lifting or shifting the accelerator foot. In a majority of braking systems currently in use, any application of the brakes requires a 6 inch up and over movement of the foot from the accelerator pedal to the brake pedal, in addition to a downward thrust on the pedal on the order of 2 to 4 inches. Furthermore, a full application of the brakes requires a downward thrust of from 20 to 50 pounds depending upon various conditions and the operating foot needs to be returned to the accelerator pedal. With that arrangement an often dangerous delay of approximately one second in the effective application of the brakes results, which constitutes a major contributing factor in traffic accidents. In a vehicle equipped with my invention the left foot of the operator may depress upon the pedal 17 at B by about ½ inch at a pressure on the order of from 3 to 6 pounds to actuate the valve unit to deliver maximum negative pressure to the power unit. The pedal unit is especially designed to support the normal weight of the foot of the operator and either a rocking movement of the foot or a shift of the position of the foot along the pedal may be effective to actuate the valve, thus minimizing the time required to effect a braking of the vehicle.

The operation and functioning of the units and elements employed in the present invention, as generally associated with automotive power-brake applications, is further described as follows:

The power unit 9 is adaptable to applying 100% of the range of vacuum and atmospheric power required for activation of the braking mechanisms of cars, which at different stages may vary from 0 to 50 pounds or more pressure as applied at the brake-pedal 1. Vacuum power application is in complete control of the pedal 17, and responsive to a tilting movement of generally ½" and of a pressure of 2 to 5 pounds by the foot of the operator on said pedal. And the control may be so finely graduated that pressures transmitted by the power unit 9 to the pedal 1 may be applied in increments of as little as 2 to 3 pounds.

In such an automotive application the chamber 69a is generally subject to negative pressures ranging from 7 to 10 pounds per square inch in periods of brake application in which the engine is normally idling. In the same periods the requirements of brake applications and release may call for rapidly changing negative pressures in the power unit 9 varying from 0 to 10 pounds per square inch. The manner in which these pressure requirements are smoothly and sensitively graduated and controlled is here further explained and described with reference to Figures 6, 7 and 8.

In Figure 6 the elements of valve assembly 19, are shown in a neutral position, in which position the valve plug 73 is seated and closes the chamber 69b to the source of vacuum, the disk 81 is moved from its seat by the pressure of member 88 upon the spring 85c and of it upon the 82, and the chamber 69b and the power unit 9 through its conduit 19b, are open to full atmospheric pressure.

In Figure 7 the valve is shown as in an initial stage for the application of vacuum effect to the power unit 9, as a result of a short downward tilt of the pedal 17 at B and a corresponding short lift of the yoke plate 59b. At this stage the tapered valve plug 73 has opened a small area of the port 72 to the passage of vacuum effect to the chamber 69b, and the screw 88 has been raised to allow the side portion of the disk 81 to contact the port 78a, under the resilient pressure of the spring 83, partially counteracted by the tension of the spring 85 acting on the end of the pin 82. The admission of atmospheric air to the chamber 69b is thus in the form of a thin film of air between the edge of the port 78a and the disk 81 which is subject to atmospheric pressure and to resilient pressures by the spring 85 from above and to negative pressures from below, all favoring the inflow of atmospheric air to chamber 69b, and the disk 81 is simultaneously subject to resilient pressures by the spring 83 from below which tend to restrict the inflow of such air.

The velocity and volume of said thin film of atmospheric air is thus under the fine metering control of the springs 83 and 85 acting upon the disk 81, which springs are responsive to the movements and the positions of the valve stem assembly and to the movements and positions of the pedal 17 linked to said valve stem assembly. The coils of the conical spring 83 of larger diameter provide for a relatively wide range of graduated power applications at light pressures, to correspond generally to the ranges of low pressures required for activation of pedal 1 in partial braking applications. The spring 85 aids in making the pressure control extremely sensitive.

Progressive downward movement of the pedal 17 at B causes a corresponding rise in the valve stem assembly and proportionately increases the effective opening of the port 72 and the admission of vacuum effect to the chamber 69b and synchronously increases the tension in the spring 83 upon the disk 81 and decreases the contra-tension by the spring 85, thus progressively restricting the flow of atmospheric air into chamber 69b and increasing the negative pressure in said chamber and in the power unit 9, and the direct pressures of the power unit 9, through its power take-off 10 and linkage 12 on the pedal 1, and through the pedal 1 upon the wheel brakes 8.

In Figure 8 the elements of the valve assembly 19 are shown in their positions as at the height of the movement of the valve stem assembly, wherein the port 72 is wide open, the spring 83 is firmly compressed upon the disk 81, and the positive pressure of the flange 84 is superimposed on the spring 83 to close the port 78a to the inflow of atmospheric air and to facilitate transmission of the full negative pressure of the vacuum source to the power unit 9, for application of full braking effects.

Though the units and elements of this invention may be designed and proportioned to serve effectively in the applications for which they are intended, it is generally by means of the several adjusting members, including 31, 43, 44, 86, 76 and 88, all placed within easy reach of the operator of the system, that the units and elements can be adapted and adjusted to function with optimum effectiveness through a wide range of variable and changing conditions, and to meet the needs and desires of various operators.

The operation and functioning of the units and elements described, provides for ascending and descending scales of negative pressures in the chamber 69b and the power unit 9, in extremely fine gradations and in instant and closely correlated response to the movements and static positions of the pedal 17. An important factor in this is the improved method employed in the valve assembly 19 for varying the negative pressures in the vacuum circuit between the source of vacuum, the valve assembly 19 and the power unit 9, which provides for admitting atmospheric air into the chamber 69b as in a thin film between the edge of a small port 78a and a disk 81, and finely modulating the velocity and volume of said film of air by variable resilient pressures upon the disk 81, in closely correlated response to the movements and static positions of the pedal 17. By the same means the pressures applied on the pedal 1 by the power unit 9, and by the pedal 1 upon the wheel-brakes 8, are brought into instant correlated response to the movements and static positions of the pedal 17.

Due to the consistency of this correlation of the movements and braking effects of the pedal 1, with the movements and the static positions of the pedal 17, under a given set of conditions, the operator of a car may pre-set or pre-position the pedal 17 and obtain a quick braking effect generally as anticipated.

The importance of these improvements in automotive brake controls according to this invention, will be better understood when considered in relation to the limitations in the operations and functioning of other automotive vacuum power brake systems, and of the standard foot-power brake systems, in common use.

In many other automotive vacuum power brake systems in common use, the vacuum power unit is employed to supply generally from 30% to 50% of the total braking power required, and the negative pressures in said power unit are controlled by intermittent opening and closing of popping or tripping vacuum and atmospheric air valves. These valves being responsive to hydraulic pressures applied and variable by downward and upward movements of a standard right-foot brake-pedal through a range of generally 2" to 4", and under generally 5 to 20 pounds of pressure by the foot of the operator of a car, which involves movement of the foot from the accelerator or from the floorboard to the brake-pedal, and return, in a circuit of movement of generally 12" or more. Vacuum power controls of these types preclude finely correlated control of the actual braking effects with the movements or the static positions of the said brake-pedal, and there is generally a definite lag in the response of the vacuum power unit to the pedal movements, which materially reduces the effectiveness of the power unit when the brake-pedal is moved down and up in quick actions as in an emergency.

The controls used in systems of these types also preclude the making of adjustments in the functioning of the controls from within the driving compartment.

I claim:

1. A vacuum valve assembly for use with vacuum power units including a first chamber adapted to be subjected to a source of vacuum and a second chamber adapted for communication with a power unit, a valve between said chambers and a movable member adapted to open and close said valve to thereby establish communication between said first chamber and said second chamber, said second chamber having a valve port open to atmospheric pressure, and a closure member for said valve port adapted to regulate the negative pressure in said second chamber, said closure member being subjected to the pressure within said second chamber, said closure member being subjected to atmospheric pressure through said valve port in a direction tending to open said valve port, resilient means for biasing said closure member toward valve closing position, and means operative in response to movement of said movable member away from its valve closing position for increasing the force exerted by said resilient means to thereby increase the force tending to close said valve port.

2. A vacuum valve assembly for use with vacuum power units including a first chamber adapted to be subjected to a source of vacuum and a second chamber adapted for communication with a power unit, a valve between said chambers and a movable member adapted to open and close said valve to thereby establish communication between said first chamber and said second chamber, said second chamber having a valve port open to atmospheric pressure, and a closure member for said valve port adapted to regulate the pressure in said second chamber, said closure member being subjected to the pressure within said second chamber, said closure member being subject to atmospheric pressure through said valve port in a direction tending to open said valve, resilient means for biasing said closure member toward valve closing position, and means operative in response to movement of said movable member away from its valve closing position for increasing the force exerted by said resilient means to thereby increase the force tending to close said valve port.

3. A vacuum valve adapted to control the vacuum between a source of vacuum and a vacuum power unit including a first chamber adapted for communication with said source of vacuum and a second chamber adapted for communication with said power unit, a valve port between said chambers and a valve-regulating member adapted upon progressive movement thereof to increase the area of communication through said valve port and between said chambers, said second chamber having an atmospheric port and a movable member therein adapted to seat against and thereby close said port, resilient means for biasing said movable member toward closing position, means operative in response to progressive movement of said valve-regulating member to increase the force exerted by said resilient means.

4. A vacuum valve adapted to control the vacuum between a source of vacuum and a vacuum power unit including a first chamber adapted for communication with said source of vacuum and a second chamber adapted for communication with said power unit, a valve between said chambers and a valve-regulating member adapted upon progressive movement thereof to increase the area of communication through said valve port and between said chambers, said second chamber having an atmospheric port and a movable member therein adapted to seat against said port and thereby regulate the inflow of air through said port, resilient means for biasing said movable member toward closing position, means operative in response to progressive movement of said valve-regulating member to increase the force exerted by said resilient means, and positive means for moving said closure member toward open position in response to movement of said valve-regulating member to closed position.

5. A vacuum valve assembly for use with vacuum power units including a chamber adapted for connection with a power unit, said chamber having a first port adapted for communication with a source of vacuum and a second port adapted for communication with the atmosphere, a movable valve plug adapted to close said first port and a disk-like member adapted to close said second port, a valve stem extending into said chamber and connected to said plug and means for moving said stem to thereby subject said chamber to vacuum, a spring surrounding said stem and having one end fixed with respect to the base of said stem and another end thereof in contact with said disk to thereby exert a resilient port closing force upon said disk, said resilient force on said disk member increasing and decreasing, respectively, when said valve plug is moved away from or toward said vacuum port.

6. A vacuum valve assembly including a housing having a first chamber and a second chamber therein, said first chamber having an inlet adapted for communication with a source of vacuum and said second chamber having an outlet adapted for communication with a vacuum power unit, a first valve port establishing communication between said chambers and a plug for opening and closing said valve port, a valve stem extending through said second chamber and connected to said plug, means for displacing said stem to thereby open and close said valve, an atmospheric port formed in said housing and leading into said second chamber, a disk freely mounted on said stem and adapted to seat against and regulate the inflow of air through said atmospheric port, a spring extending between an abutment carried by said stem and said disk and adapted to apply resilient pressures on said disk and thereby regulate the flow of air through said port and close said port, said spring being progressively compressed in response to movement of said stem in progressively opening said first valve port to progressively increase the resilient closing force exerted on said disk.

7. A vacuum valve assembly as recited in claim 6 wherein the convolutions of said spring are generally conically disposed and are adapted for compression into a common plane, and movement of said stem and plug into fully open position compresses said stem into a common plane wherein said convolutions bear against said disk to exert a positive closing force on said disk.

8. A vacuum valve assembly as recited in claim 6 wherein said disk includes an upstanding member extending through said atmospheric port and a resilient member is adapted to bias said member and said disk away from said atmospheric port.

9. A vacuum valve assembly as recited in claim 8 wherein said means includes a yoke external to said housing and said stem is connected to said yoke for movement with said yoke, and a member is carried by said yoke in a position to positively force said upstanding member and said disk away from said atmospheric port when said stem and said plug move into valve closing position.

10. A vacuum valve assembly as recited in claim 9 wherein said abutment is adustable with relation to said stem to thereby vary the resilient closing force exerted on said disk by said spring and said resilient member is adjustable to vary the force exerted on said member in opposition to the force of said spring.

11. In combination with a vehicle having a brake-operating linkage and a source of vacuum, a vacuum-responsive power unit interconnected with said linkage, a control valve assembly in a line of communication between said source of vacuum and said power unit, said control valve assembly including a chamber having a first port in communication with said source of vacuum, a second port in communication with said power unit, said chamber having a third port communicating with the atmosphere, a movable valve-actuating member extending into said chamber, and a pedal adapted upon movement thereof to move said actuating member, means for progressively opening said first port in response to progressive movement of said pedal, resilient means adapted to close said third port in response to initial movement of said pedal, and means for progressively increasing the force exerted by said resilient means in response to progressive movement of said pedal to thereby progressively increase the negative pressure in said power unit and the brake-operating force exerted on said linkage.

12. In combination with a vehicle having a brake-operating linkage and a source of vacuum, a vacuum-responsive power unit interconnected with said linkage, a control valve assembly in a line of communication between said source of vacuum and said power unit, said control valve assembly having a chamber having a first port in communication with said source of vacuum, a second port in communication with said power unit, a valve communicating with the atmosphere, a movable valve-actuating member extending into said chamber, and a pedal adapted upon movement thereof to move said actuating member, means for progressively opening said first port in response to progressive movement of said pedal, said atmospheric valve including a port opening through a wall of said chamber to the atmosphere and a disk adapted to resiliently seat against said wall and regulate the inflow of air through said port, resilient means for biasing said disk against said wall of said chamber, movement of said pedal and said actuating member in opening said first-named port being effective to increase the biasing force exerted by said resilient means against said disk to thereby progressively increase the negative pressure within said chamber and said power unit and thereby increase the brake-operating force exerted on said linkage by said power unit.

13. The structure set forth in claim 12 characterized by and including a member movable with said valve-actuating member adapted to force said disk away from said atmospheric port as said first-named port is closed to said source of vacuum.

14. The structure of claim 12 wherein said valve assembly includes a housing defining said chamber, and operator regulated means external to said housing are provided for varying the bias of said resilient means.

15. The structure of claim 12 wherein said valve assembly includes a housing defining said chamber and said valve-actuating member is carried by a unit interconnected with said pedal for movement with said pedal, and resilient means are provided for biasing said disk away from said atmospheric port.

16. The structure of claim 12 wherein a housing defines said chamber and said actuating member extends through a wall of said housing, said resilient means being seated against an abutment within said housing, said abutment being adjustable with relation to said actuating member, and means external to said housing are provided for adjusting said abutment.

17. In combination with a vehicle having a source of vacuum and brake linkage, a pedal for actuating said linkage, a vacuum power unit adapted for interconnection with said linkage and an auxiliary brake-operating unit for energizing said power unit and said brake linkage, said auxiliary unit including a valve unit having a base connected with the frame of the vehicle and adapted to establish communication between said source of vacuum and said power unit, a pedal unit having a base connected to the frame of said vehicle and adjustable with relation to said valve unit, and a valve operating a linkage movable in response to movement of an additional pedal carried by said pedal unit for actuating said valve unit to energize said vacuum power unit.

18. The structure of claim 17 characterized by and including a pivotal connection between the base of said valve unit and the base of said pedal unit, said linkage having a portion adapted for abutting-contact with a portion of said pedal at a point generally concentric with said pivotal connection.

19. The structure of claim 17 characterized by and including a second operating linkage mounted on a base connected to said vehicle frame for actuation by the clutch linkage of said automobile, said second linkage being interconnected with said first linkage to thereby actuate said valve.

20. A brake control mechanism including a vacuum valve adapted to be positioned in a line of vacuum flow between a source of vacuum and a vacuum power unit, a valve stem adapted upon progressive movement thereof to progressivley increase the vacuum from said source through said valve to said power unit, a pedal operatively interconneuted with said stem to impart progressive movement to said stem in response to progressive movement of said pedal, resilient means for biasing said pedal toward a neutral postion, and adjustable retarding means adapted to offer a predetermined resistance to movement of said pedal.

21. The structure of claim 20 characterized by and including a rack carried by said pedal, and a pawl engageable with said rack.

22. The structure of claim 20 characterized by and including a rack and pawl engageable with said rack for retarding movement of said pedal, said rack and pawl having teeth engageable with one another, the teeth of said pawl being spaced from one another a different amount from the spacing of the teeth of said rack.

23. The structure of claim 20 characterized by and including a pawl and rack engageable one with the other for retarding movement of said pedal, said pawl being mounted for pivotal movement with respect to said rack and for sliding movement away from said rack.

24. The structure of claim 20 characterized by and including a pawl and rack assembly for retarding movement of said pedal, said rack being carried by said pedal and said pawl being mounted in a member positioned alongside said pedal, said pawl having a plurality of teeth engageable with said rack, and adjustable resilient means for varying the resisting force imparted by said pawl to said rack.

25. The structure of claim 20 characterized by and including a pawl movable with said pedal and a rack stationary with respect to said pawl for retarding movement of said pedal.

26. The structure of claim 20 characterized by and including a rack carried by said pedal, and a pawl carried by an upstanding member adjacent to said pedal, the spacing of the teeth of the pawl being different from the spacing of the teeth of the rack, said pawl being mounted for pivotal and sliding movement in said upstanding member, and an adjustable spring carried by said upstanding member adjacent to said connection between said pawl and said upstanding member to thereby vary the resistance offered by said pawl to movement of said pedal and rack.

27. An auxiliary braking system adapted for use with a servo-mechanism-actuated braking assembly, the servo-mechanism braking assembly including a vacuum power unit adapted for operation of said servo-mechanism, a valve adapted for communication with a source of vacuum and said vacuum power unit, and a foot-actuated member for operating said valve including a generally elongated pedal and a support for said pedal, said support having sufficient rigidity to maintain said pedal in an inoperative position when the weight of the applied foot is positioned directly over said support, said support being sufficiently yieldable to allow said pedal to rock about said support as a pivot when the same foot pressure is shifted away from the support, whereby rocking of the applied foot is sufficient to operate said valve and actuate said power unit.

28. An auxiliary brake-controlling assembly for automobiles provided with a frame-mounted clutch pedal and foot pedal, including a vacuum power unit adapted for mechanical interconnection with said brake pedal, and a foot-actuated control unit for said vacuum power unit including a valve body adapted to establish communication between a source of vacuum and said vacuum power unit, said valve having an inlet and an outlet and a valve closure adapted in one position thereof to prevent communication between said inlet and said outlet, and in other positions thereof to establish communication between said inlet and said outlet, means for moving said valve closure member between said positions including a pedal adapted to be positioned for operation by the left foot of the operator, said pedal being supported intermediate its length by a generally resilient member having a stiffness such that normal foot pressure applied to said pedal over said support maintains said pedal in a generally fixed plane, said support being sufficiently resilient to allow tilting movement of said pedal when normal foot pressure is applied on the pedal at the side of the support, and a linkage interconnecting said pedal and said valve closure member.

29. An auxiliary braking assembly for automobiles provided with a clutch pedal and foot pedal, including a vacuum power unit adapted for mechanical interconnection with said brake pedal, and a foot-actuated control unit for said vacuum power unit including a valve body adapted to establish communication between a source of vacuum and said vacuum power unit, said valve having an inlet and an outlet and a valve closure member adapted in one position thereof to prevent communication between said inlet and said outlet, and in other positions thereof to establish communication between said inlet and said outlet, means for moving said valve closure member between said positions including a pedal adapted to be positioned closely adjacent said clutch pedal, said pedal being supported intermediate its length by a generally resilient member having a stiffness such that normal foot pressure applied to said pedal over said support maintains said pedal in a generally fixed plane, said support being sufficiently resilient to allow tilting movement of said pedal when normal foot pressure is applied on the pedal at the side of the support, means for interconnecting said pedal with said valve closure member and extending to a position beneath said clutch pedal whereby movement of said clutch pedal actuates said valve member.

30. A vacuum valve for use with vacuum operated power brakes and the like including a valve housing having a chamber and an outlet leading from the chamber, means for admitting vacuum effects to said chamber including a valve seat and a valve closure element for said seat, an atmospheric port leading into said chamber and a disk adapted to seat against said port to therefore restrict the flow of air to said port, opposed resilient means for biasing said disk both toward and away from said port, movement of said valve closure element away from its seat being effective to increase the resilient bias tending to force said disk against said port.

31. A vacuum and atmospheric valve assembly for use in controlling vacuum and atmospheric pressures between a source of vacuum and a unit for application of vacuum power, including a housing having a first chamber adapted to be subjected to a source of vacuum and a second chamber having valve means for regulating and modulating said vacuum and atmospheric pressures, said chambers being separated by a partition member having therein a vacuum valve port.

32. The structure of claim 31 wherein said means for regulating said vacuum and atmospheric pressures within said second chamber and within a power-unit connected therewith, includes said vacuum valve port and closure plug adapted for graduated admission of vacuum effect from said first chamber to said second chamber, and including an atmospheric valve and port for controlled admission of atmospheric air to said second chamber, and said valve means are operable in predetermined correlation by a single valve-stem member joined to said vacuum valve plug and extending through a wall in said housing for actuation by external means.

33. The structure of claim 32 wherein said means for regulating said vacuum and atmospheric pressures within said second chamber and said power unit, includes a resilient member within said second chamber and a second resilient member external thereto, adapted for actuation in predetermined correlation by a single external member adapted to act upon both resilient members simultaneously to regulate and modulate the pressures within said second chamber and in said power unit in predetermined correlation with the positions and movements of said external operating member.

34. The structure of claim 33 including a plurality of external members carried by said external operating member for adjusting the tensions in said external and internal resilient members for regulating the relationships of the vacuum and atmospheric pressures, with the positions and movements of said external operating member, to meet specific power requirements.

35. In combination a motor-vehicle, a brake-activating foot pedal and a clutch-actuating foot pedal therefor, a foot pedal activating vacuum power unit, a vacuum and atmospheric control valve for said power unit, a pivoted arm for actuating said control valve, one end of said arm being disposed adjacent to said clutch actuating foot pedal providing for operation of said brake-activating foot pedal by the power unit, through operation of the vacuum valve by the movement of said clutch pedal.

36. In combination a motor vehicle, a brake activating foot pedal, a foot pedal activating power vacuum power unit, a clutch activating foot pedal, and a vacuum and atmospheric control valve for said power unit, dual means for activating said control valve, including a foot pedal linked to said control valve for operation by the foot of the driver, and including a pivoted arm having one end disposed adjacent to said clutch activating pedal for operation by movement of said clutch pedal.

References Cited in the file of this patent

UNITED STATES PATENTS

| | | |
|---|---|---|
| 1,721,290 | Badertscher | July 16, 1929 |
| 2,039,076 | Folberth et al. | Apr. 28, 1936 |
| 2,076,532 | Francoeur et al. | Apr. 13, 1937 |
| 2,087,305 | Schmitt et al. | July 20, 1937 |
| 2,252,013 | Leupold | Aug. 12, 1941 |
| 2,278,887 | Larson | Apr. 7, 1942 |
| 2,316,396 | Breese | Apr. 13, 1943 |
| 2,324,412 | Milster | July 13, 1943 |
| 2,373,272 | Stelzer | Apr. 10, 1945 |
| 2,384,805 | Arens | Sept. 18, 1945 |
| 2,392,086 | Fisher | Jan. 1, 1946 |
| 2,477,496 | Russell | July 26, 1949 |
| 2,539,538 | Hayes | Jan. 30, 1951 |
| 2,562,704 | Dubreuil | July 31, 1951 |
| 2,618,457 | Davidson | Nov. 18, 1952 |
| 2,654,562 | Foster | Oct. 6, 1953 |
| 2,724,398 | Higgins et al. | Nov. 22, 1955 |